US011650791B2

(12) United States Patent
Lu et al.

(10) Patent No.: US 11,650,791 B2
(45) Date of Patent: May 16, 2023

(54) RELATIVE NARRATION

(71) Applicant: Microsoft Technology Licensing, LLC, Redmond, WA (US)

(72) Inventors: David Lu, Seattle, WA (US); Allen L. Ussher, Seattle, WA (US); Jennifer L. Bost, Carnation, WA (US); Brian S. Stucker, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 460 days.

(21) Appl. No.: 15/403,737

(22) Filed: Jan. 11, 2017

(65) Prior Publication Data

US 2018/0196636 A1 Jul. 12, 2018

(51) Int. Cl.
*G06F 3/048* (2013.01)
*G06F 3/16* (2006.01)
*G10L 13/08* (2013.01)
*G06F 3/04842* (2022.01)

(52) U.S. Cl.
CPC .............. *G06F 3/167* (2013.01); *G10L 13/08* (2013.01); *G06F 3/04842* (2013.01)

(58) Field of Classification Search
CPC ........... G06F 3/16; G06F 3/0481; G06F 3/167
See application file for complete search history.

(56) References Cited

U.S. PATENT DOCUMENTS

| 8,548,618 | B1 | 10/2013 | Story et al. |
| 8,744,852 | B1 | 6/2014 | Seymour et al. |
| 8,862,985 | B2 | 10/2014 | Gallo et al. |
| 9,031,493 | B2 | 5/2015 | Morton et al. |
| 9,263,026 | B2 | 2/2016 | Hofstader et al. |
| 9,311,286 | B2* | 4/2016 | Bank ..................... G06F 40/157 |
| 2003/0051211 | A1* | 3/2003 | Fujisaki ............... G06Q 10/107 715/255 |

(Continued)

FOREIGN PATENT DOCUMENTS

| CN | 105389078 A | 3/2016 |
| CN | 105917404 A | 8/2016 |
| EP | 1734468 A1 | 12/2006 |

OTHER PUBLICATIONS

McKiel, Frank, "Audio-enabled graphical user interface for the Blind or visually impaired", In Proceedings of the Johns Hopkins National Search for Computing Applications to Assist Persons with Disabilities, Feb. 1, 1992, pp. 185-187.

(Continued)

*Primary Examiner* — Rashawn N Tillery
(74) *Attorney, Agent, or Firm* — NovoTechIP International PLLC

(57) ABSTRACT

A computing device and a method for generating relative narration. In one instance, the computing device include a display device displaying a graphical user interface including textual information received from a first application. An electronic processor of the computing device receives a user interface element associated with the textual information scheduled for relative narration. The electronic processor extracts a plurality of entities from the user interface element, converts the plurality of entities into a narrated string using a second application, generates the relative narration of the textual information using the narrated string, and output the relative narration.

17 Claims, 7 Drawing Sheets

(56) References Cited

U.S. PATENT DOCUMENTS

| | | | | |
|---|---|---|---|---|
| 2003/0158736 | A1* | 8/2003 | James | G06F 3/167 |
| | | | | 704/270.1 |
| 2007/0133771 | A1* | 6/2007 | Stifelman | H04M 3/48 |
| | | | | 379/142.01 |
| 2010/0070863 | A1 | 3/2010 | Lu et al. | |
| 2012/0101812 | A1* | 4/2012 | Reding | G10L 15/30 |
| | | | | 704/201 |
| 2012/0192059 | A1 | 7/2012 | Laskaris et al. | |
| 2012/0215540 | A1* | 8/2012 | Goktekin | H04L 51/066 |
| | | | | 704/260 |
| 2013/0219277 | A1* | 8/2013 | Wang | G06F 3/167 |
| | | | | 715/728 |
| 2013/0304845 | A1* | 11/2013 | Sanjeev | G06F 16/9566 |
| | | | | 709/217 |
| 2014/0237368 | A1* | 8/2014 | Canitz | G06F 3/167 |
| | | | | 715/729 |
| 2014/0237369 | A1 | 8/2014 | Canitz | |
| 2014/0237370 | A1* | 8/2014 | Canitz | G06F 3/167 |
| | | | | 715/729 |
| 2014/0258462 | A1 | 9/2014 | Hwang | |
| 2015/0120800 | A1 | 4/2015 | Yarvis et al. | |
| 2015/0319116 | A1* | 11/2015 | Chavali | H04L 51/20 |
| | | | | 709/206 |
| 2016/0112362 | A1* | 4/2016 | Perazzo | G06Q 10/063114 |
| | | | | 455/466 |
| 2016/0260430 | A1 | 9/2016 | Panemangalore et al. | |
| 2018/0034755 | A1* | 2/2018 | Saoji | G06Q 30/0261 |
| 2019/0122200 | A1* | 4/2019 | Kurian | G06Q 20/102 |
| 2021/0343269 | A1* | 11/2021 | Sathsahayaraman | G10L 13/04 |

OTHER PUBLICATIONS

"KNFB Reader Makes the Print Yours", https://nfb.org/knfbreader, Retrieved on: Nov. 30, 2016, 3 pages.

"International Search Report and Written Opinion Issued in PCT Application No. PCT/US18/012438", dated Apr. 20, 2018, 11 Pages.

"Office Action Issued in Indian Patent Application No. 201947030662", dated Sep. 10, 2021, 7 Pages.

"Office Action Issued in European Patent Application No. 18701838.7", dated Oct. 20, 2021, 7 Pages.

"First Office Action and Search Report Issued in Chinese Patent Application No. 201880006595.8", dated Jan. 7, 2022, 11 Pages.

"Third Office Action Issued in Chinese Patent Application No. 201880006595.8", dated Aug. 17, 2022, 13 Pages.

"Office Action and Search Report Issued in Chinese Patent Application No. 201880006595.8", dated Jun. 7, 2022, 13 Pages.

"Office Action Issued in Chinese Patent Application No. 201880006595.8", dated Jan. 5, 2023, 12 Pages.

* cited by examiner

RELATIVE NARRATION

FIELD

Embodiments relate to systems and methods for generating relative narration of textual information presented in a user interface on a display.

BACKGROUND

A user typically interacts with a computer running a software program or application via a graphical user interface (for example, a graphical user interface (GUI)). The user may use a touchpad, keyboard, mouse, or other input device to enter commands, selections, and other input. The application then responds to or processes this input. The graphical user interface may present links, controls, data, or other interactive options for the user in a visual form such as texts or images. While graphical user interfaces are useful, there are times when an aural or audio interface is useful. For example, an audio interface is useful when a user has impaired vision or when it is impossible or impractical to view the graphical user interface, such as when a user is operating an automobile and maintaining his or her gaze on the road ahead.

SUMMARY

Narration-based applications generally deliver information contained in the graphical user interface by reading (for example, via a text-to-speech conversion) what is shown on the screen in a literal or verbatim manner. Generally, existing, narration-based applications provide a binary experience (in other words, whether narration is provided or not). Apart from adjusting the speed or vocal characteristics of the voice (male, female, etc.) it isn't feasible to specify the fidelity level of the information being read out to the user. As noted, existing applications are designed to read exactly what is on the screen in an effort to ensure fidelity in the transformation from a visual experience to an audible experience. However, literally reading elements in the graphical user interfaces often produces an audio output that is difficult to comprehend. Additionally, user interfaces built primarily for a visual framework do not translate well to an audible experience. Currently-available narration-based user interfaces usually fail to consider human cognitive processes that take place while visually gathering information from a display screen and translate those cognitive processes into processes that occur when gathering information aurally. Information laid out on a display screen is typically scanned and rescanned by the human eye and brain using context and association. This facilitates navigation of the information. Translating textual and/or graphical information to an audio format (with precision) results in overloading the listener with details since the streamed format prevents the user from efficiently scanning/re-scanning material. As a result, task completion times are often increased by a factor of three to ten times the original visual task completion times as listeners struggle to comprehend what they are listening to. For example, accessibility solutions, such as VoiceOver, only read what is provided on a display screen associated with a computer system. Information that is known to the computer system but resident outside of the user interface is typically not considered when deciding on what the narration experience should be. Some embodiments provide a computing device having a mode of operation that may be selected by a user or automatically (based on interactions with a particular application), which allows a narrator to combine information outside of the application to transform or augment the narration experience from a literal reading of text in a graphical user interface to one that is "relative" to what is seen on the display. In one example, the computing device is configured to extract objects from a user interface and compare it to known objects such as documents, contacts, times, locations, browsing history, social graph information, and information from other applications associated with the current user. In another example, a user may be able to activate a user-selectable-mode within the computing device to provide relative narration. In some embodiments, the relative narration of the textual information may be performed by accessing an entity extraction module to generate the audio narration of the textual information.

Embodiments provided herein allow narrators to replace reading out of information such as "jdoe@example.com" with "John Doe" because the email address jdoe@email.com maps to a known contact for the user stored within the computer system. Similarly, instead of reading a time stamp (for example, 12:01 pm) on a web interface, a relative indication of the same information (such as "a few minutes ago" or "just now") may be used for narration based on comparing the time stamp with a local time associated with the computer system. In one example, locations known to the system may be read out in a friendly way or more commonly-used manner. For example, the address "1060 W. Addison, Chicago, Ill." may be read out as "Wrigley Field."

One embodiment provides a computing device. The computing device includes a display device displaying a graphical user interface including textual information received from a first application; and an electronic processor electrically connected to the display device and configured to receive a user interface element associated with the textual information, the textual information scheduled for relative narration, extract a plurality of entities from the user interface element, convert the plurality of entities into a narrated string using a second application, generate the relative narration of the textual information using the narrated string, and output the relative narration.

Another embodiment provides a method for generating relative narration. The method includes receiving a user interface element associated with a textual information generated by a first application, the textual information scheduled for relative narration; extracting, with an electronic processor, a plurality of entities from the user interface element; converting, with the electronic processor, the plurality of entities into a narrated string using a second application; generating, with the electronic processor, the relative narration of the textual information using the narrated string; and outputting the relative narration.

Another embodiment provides a non-transitory, computer-readable medium containing computer-executable instructions that when executed by one or more processors cause the one or more electronic processors to receive a user interface element associated with a textual information generated by a first application, the textual information scheduled for relative narration; extract a plurality of entities from the user interface element; convert the plurality of entities into a narrated string using a second application; generate the relative narration of the textual information using the narrated string; and output the relative narration.

Using embodiments provided herein, the textual information on the screen of a computer or similar user device is re-interpreted using information outside of the current user interface (such as current time, browsing history, documents, other applications, etc.) to augment the narrated information without the need to modify the application generating the current user interface.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

Figure 1:
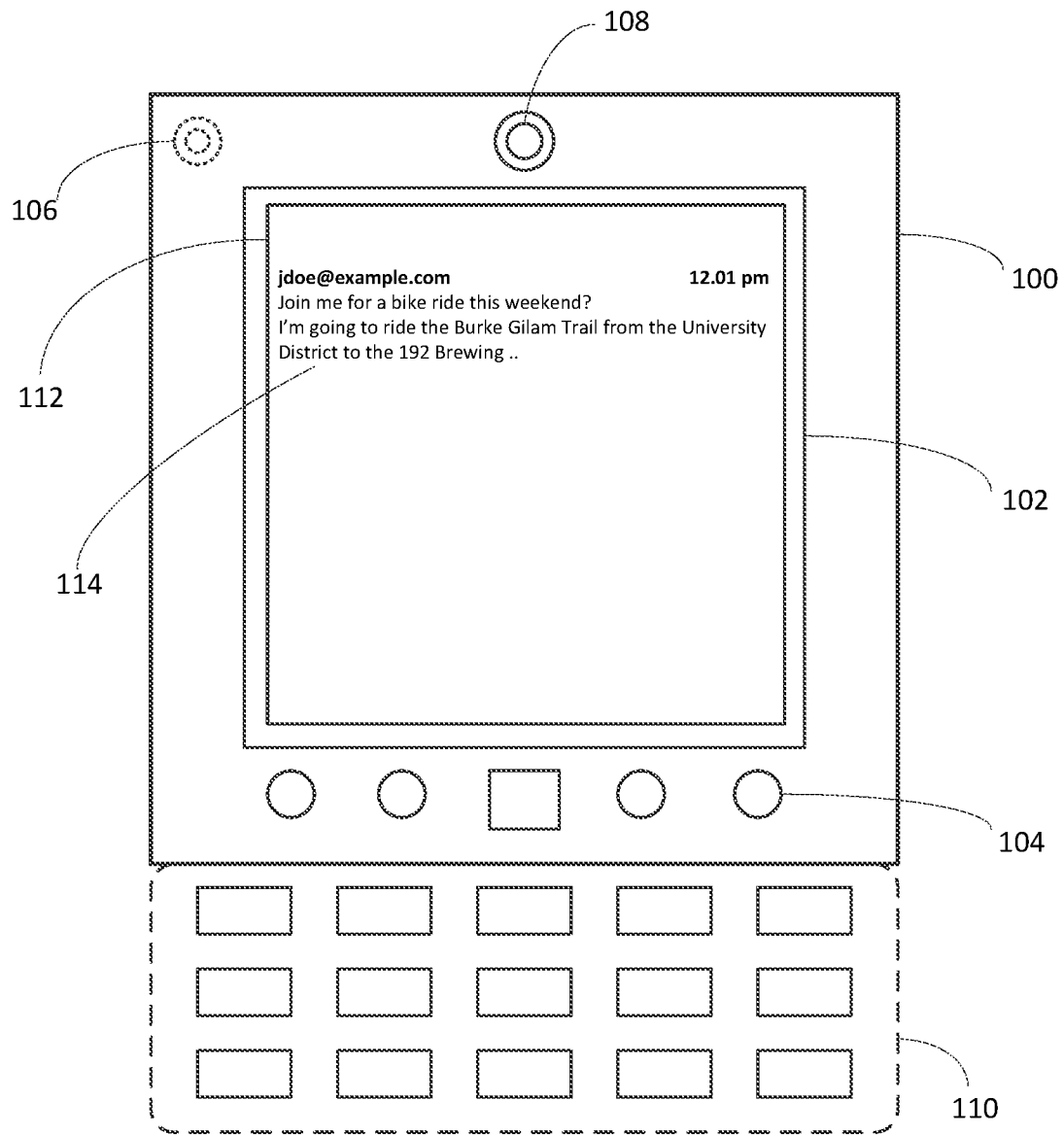
FIG. 1 illustrates a computing device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

DETAILED DESCRIPTION

Before any embodiments are explained in detail, it is to be understood that these embodiments are not limited in their application to the details of construction and the arrangement of components set forth in the following description or illustrated in the accompanying drawings. Other embodiments are possible and the embodiments described are capable of being practiced or of being carried out in various ways. Some embodiments may be a machine- or computer-implemented method, a non-transitory, computer-readable medium having a set of instructions stored thereon detailing a method that may be carried out by at least one electronic processor, or a user interface narrator for a computing device.

FIG. 1 illustrates a computing device 100 in accordance with some embodiments. In the example shown, the computing device 100 includes a display 102, input 104, speaker 106, an optional camera 108, an optional keyboard 110 and a graphical user interface 112 displaying textual information 114 associated with an application (for example, a web-based application shown in FIG. 1). The computing device 100 may use a narrator 320 (described below) to vocalize items in the graphical user interface 112, such as graphics and text. Vocalizing is the creation of relative audio narration to be played to the user representing the items on the graphical user interface 112.

Figure 2:
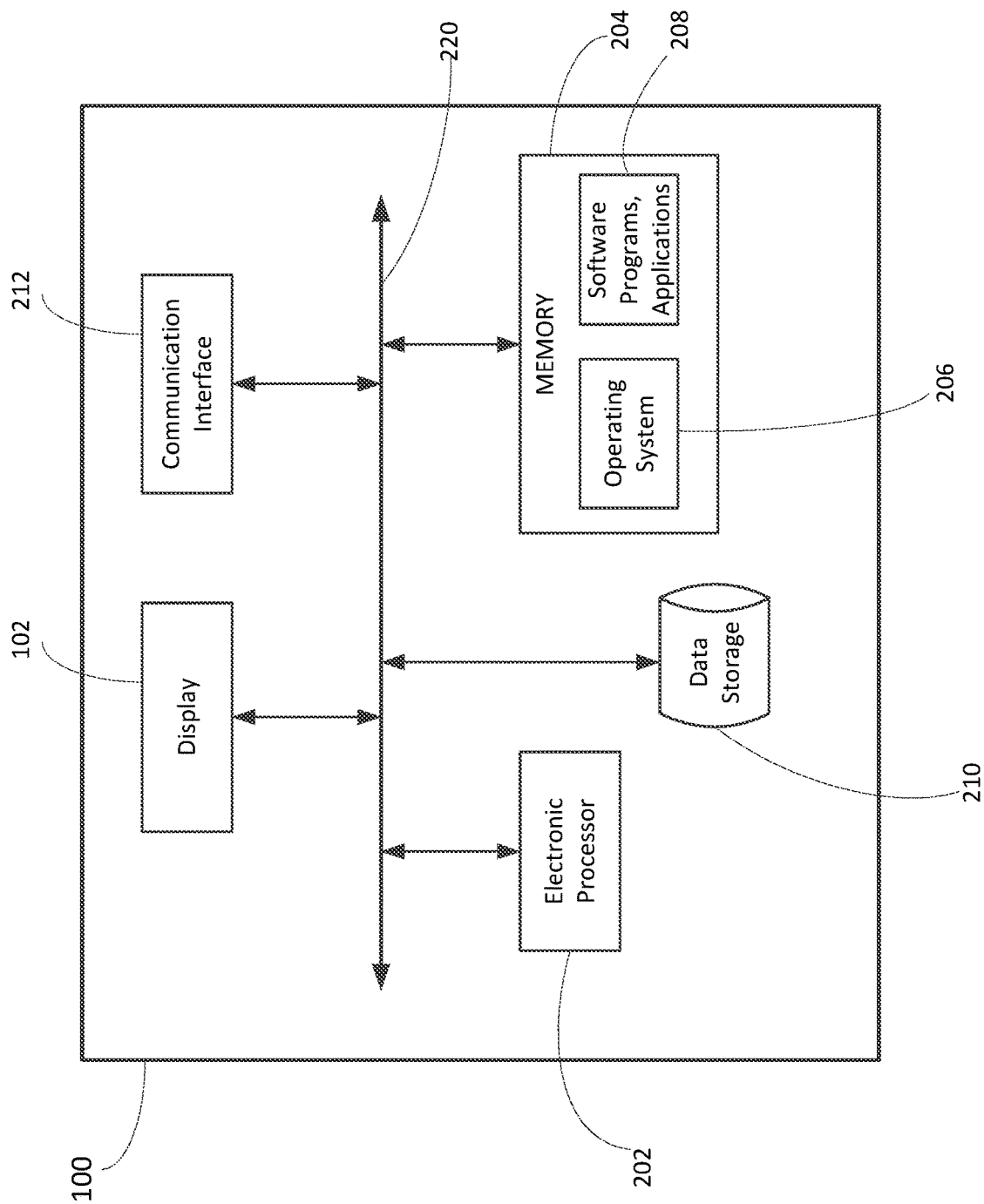
FIG. 2 illustrates a block diagram of the computing device shown in FIG. 1 in accordance with some embodiments.

FIG. 2 illustrates a block diagram of the computing device 100 in FIG. 1 in accordance with some embodiments. The computing device 100 may combine hardware, software, firmware, and system on-a-chip technology to implement a narration controller. The computing device 100 may include an electronic processor 202, a memory 204, data storage 210, the display 102, a communication interface 212, and a bus 220. The memory 204 may include an operating system 206 and one or more software programs in application module 208 that provide algorithms to analyze items in the graphical user interface 112 and render data associated with the analyzed items for vocalization. The electronic processor 202 may include at least one electronic processor or microprocessor that interprets and executes a set of instructions stored in the memory 204. In some embodiments, the one or more software programs in application module 208 may be configured to implement the methods described herein. The memory 204 may include random access memory (RAM), read only memory (ROM), or other memory and combinations thereof. The memory 204 may have a distributed architecture, where various portions of it are situated remotely from one another, but may be accessed by the electronic processor 202. The memory 204 is one kind of a non-transitory, computer-readable medium. As used in the present application, a non-transitory, computer-readable medium comprises all computer-readable media except for a transitory, propagating signal.

The data storage 210 may include a non-transitory, computer-readable medium that stores machine-readable code or instructions. In one example, the data storage 210 stores a set of instructions detailing a method provided herein that when executed by one or more processors cause the one or more processors to perform the method. The data storage 210 may also be a database or a database interface for storing an application module 208. In one example, the data storage 210 is located external to the computing device 100.

The bus 220, or other component interconnection, may permit communication among the components of the computing device 100. The bus 220 may be, for example, one or more buses or other wired or wireless connections. The bus 220 may have additional elements, which are omitted for simplicity, such as controllers, buffers (for example, caches), drivers, repeaters and receivers, or other similar components, to enable communications. The bus 220 may also include address, control, data connections, or a combination of the foregoing to enable appropriate communications among the aforementioned components.

The communication interface 212 provides the computing device 100 a communication gateway with an external network (for example, a wireless network, the internet, etc.). The communication interface 212 may include, for example, an Ethernet card or adapter or a wireless local area network (WLAN) card or adapter (for example, IEEE standard 802.11a/b/g/n). The communication interface 212 may include address, control, and/or data connections to enable appropriate communications on the external network.

Figure 3:
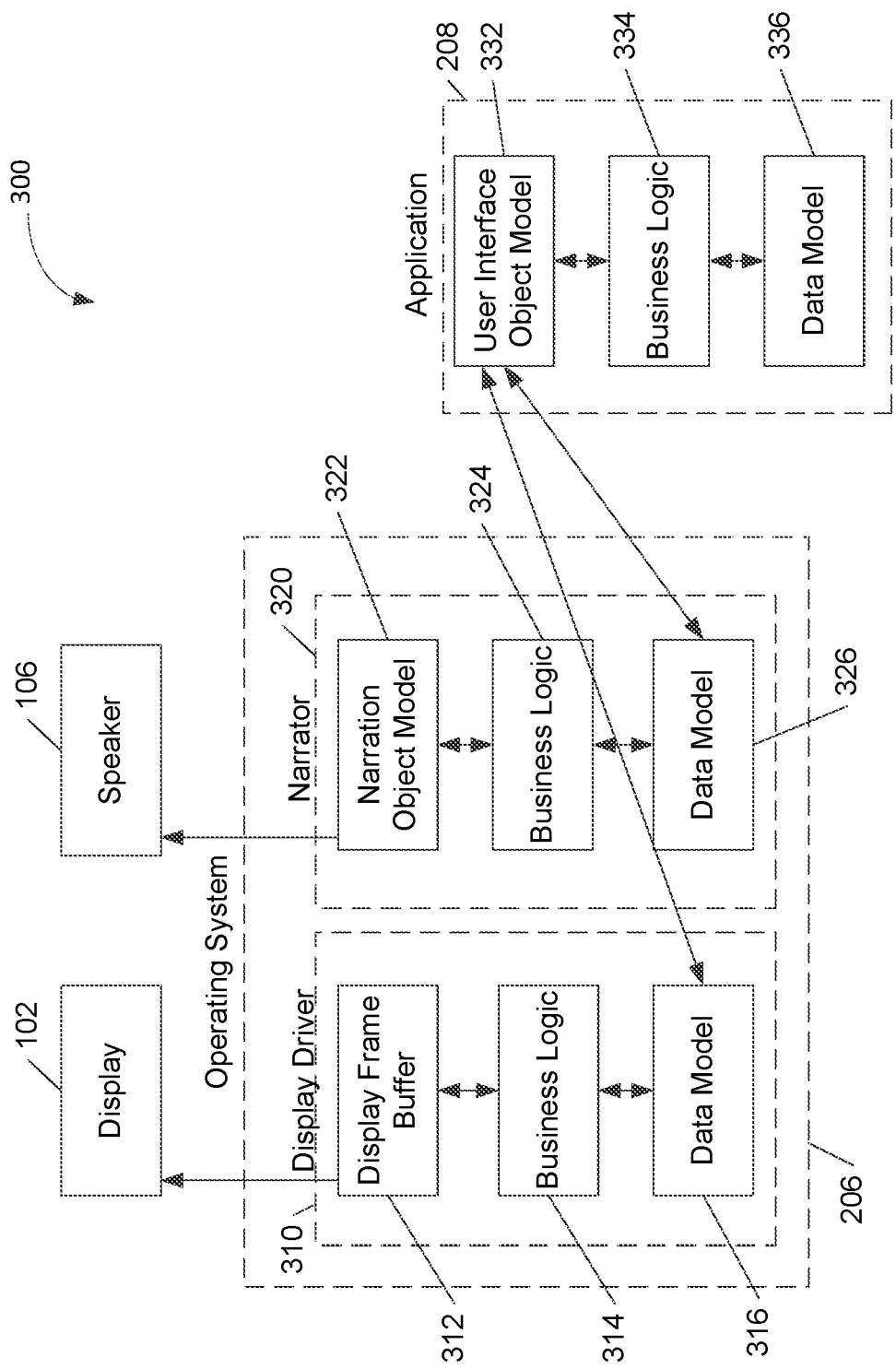
FIG. 3 illustrates an example of a software application interaction, in accordance with some embodiments.

FIG. 3 illustrates an interaction 300 of software applications, in accordance with some embodiments. Shown in FIG. 3 is an operating system 206 of the computing device 100, which manages an application module 208. The application module 208 is a software application, or portion of a software application. In one embodiment, the application module 208 includes a user interface object model 332, a business logic 334 and a data model 336. The operating system 206 includes a display driver 310 and a narrator 320. The display driver 310 includes a display frame buffer 312, a business logic 314, and a data model 316. The narrator 320 includes a narration object model 322, a business logic 324 and a data model 326. In one embodiment, the narration object model 322 includes software applications executable by the electronic processor 202 to perform natural language processing. In some embodiments, the electronic processor 202 is configured to vary at least one of a vocabulary and a grammar associated with a plurality of entities within a user interface element received from the application module 208.

Business logic 314, 324 includes software applications executable by the electronic processor 202. Business logic 314, 324 may include application logic that may be concerned with the retrieval, processing, transformation, and management of application data; application of business rules and policies; and/or ensuring data consistency and validity.

In one embodiment, the application module 208 communicates with the operating system 206 via an application binary interface (ABI) (not shown here). The application binary interface is a tool that allows the application module 208 to access specific tools, functions, and/or calls provided by the operating system 206.

In the example shown in FIG. 3, an application module 208 includes a data model 336 that provides information, which may be retrieved, processed and/or transformed using business logic 334 and presented to the user interface object model 332. In one example, data models 316 and 326 receive information (for example, text displayed in a user interface of the computing device 100) presented by the user interface object model 332. The business logic 314 and 324 augments and transforms the information received by data models 316 and 326 and provides relative narration data to display frame buffer 312 and narration object model 322, respectively. In one embodiment, the display frame buffer 312 provides the relative narration data to be displayed on display 102. In another embodiment, the narration object model 322 provides the relative narration data to be vocalized by speaker 106.

Figure 4:
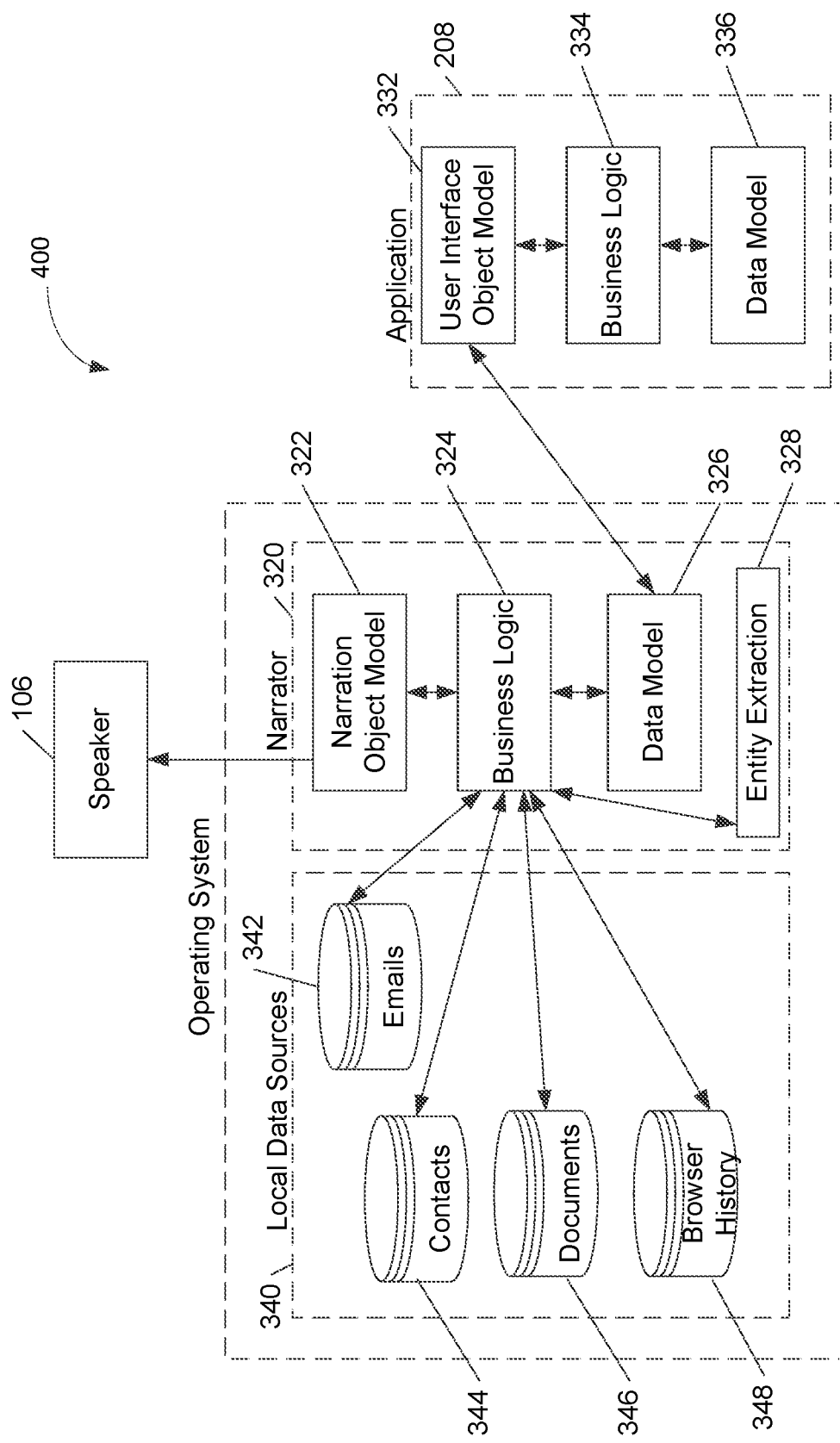
FIG. 4 illustrates another example of a software application interaction, in accordance with some embodiments.

FIG. 4 illustrates an interaction 400 of software applications, in accordance with some embodiments. In one example, the computing device 100 executes the operating system 206, which manages an application module 208. The application module 208 is a software application, or portion of a software application. The application module 208 includes a user interface object model 332, a business logic 334, and a data model 336. The operating system includes local data sources 340 and a narrator 320. In one example, the local data sources 340 include emails 342, contacts 344, documents 346, and browser history 348. The narrator 320 includes a narration object model 322, a business logic 324, a data model 326 and an entity extraction module 328. Entity extraction module 328 provides semantic knowledge to textual data thereby enabling a user to more readily understand the content and context of the textual data presented to the user.

Figure 5:
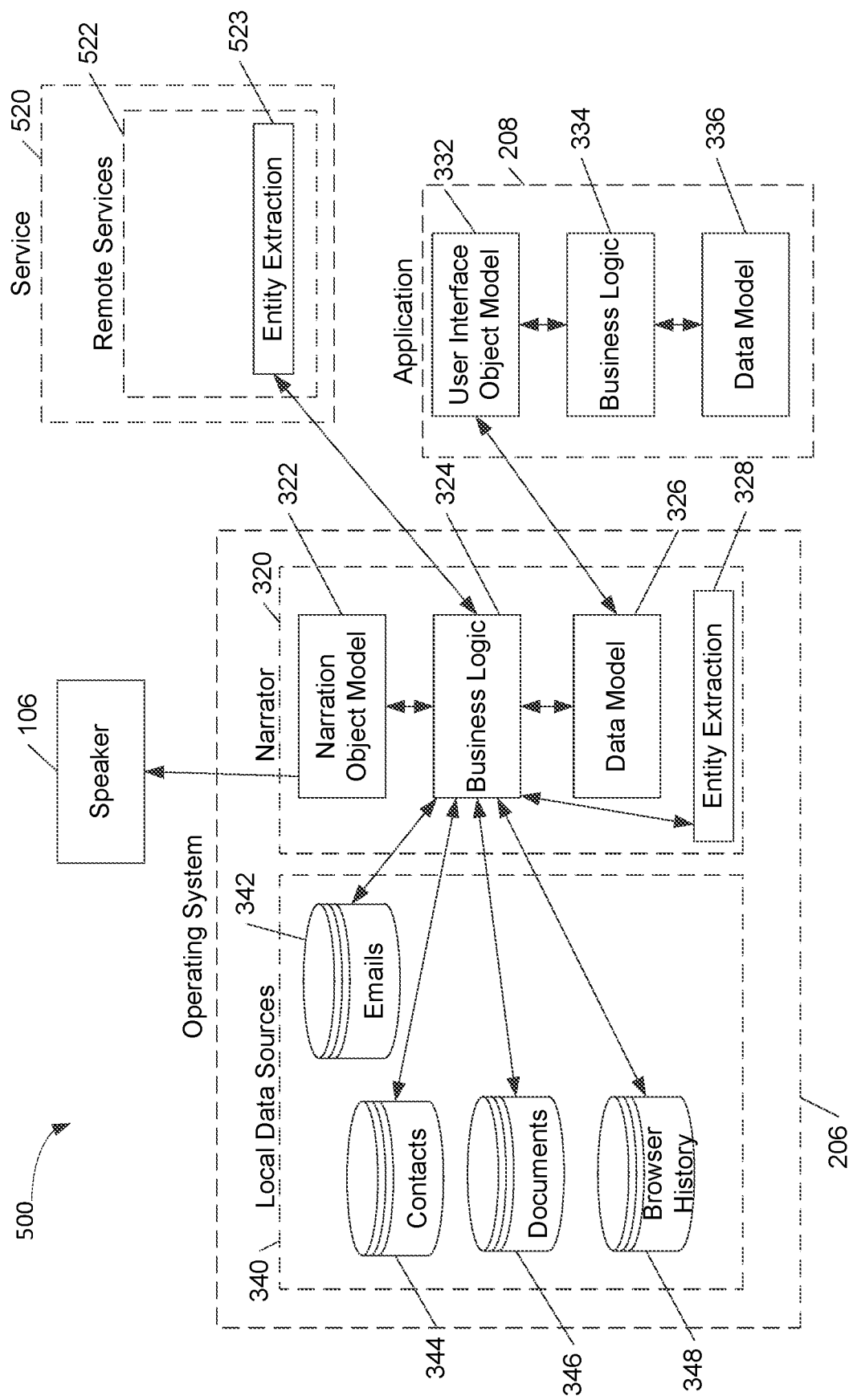
FIG. 5 illustrates another example of a software application interaction, in accordance with some embodiments.

FIG. 5 illustrates an interaction 500 of software applications, in accordance with some embodiments. As shown in FIG. 5, operating system 206 includes local data sources 340 and a narrator 320. In one embodiment, the local data sources may include emails 342, contacts 344, documents 346 and browser history 348. The narrator 320 includes a narration object model 322, a business logic 324, data model 326 and an entity extraction module 328. Also included in FIG. 5 is application module 208 and a service module 520. The application module 208 includes a user interface object model 332, a business logic 334 and a data model 336. In one embodiment, the data model 336 includes software applications executable by the electronic processor 202 that determines relationships between the different types of data that are retrieved from different sources (for example, emails, contacts, documents, browser history, etc.). The service module 520 includes remote services 522 including an entity extraction module 523.

Figure 6:
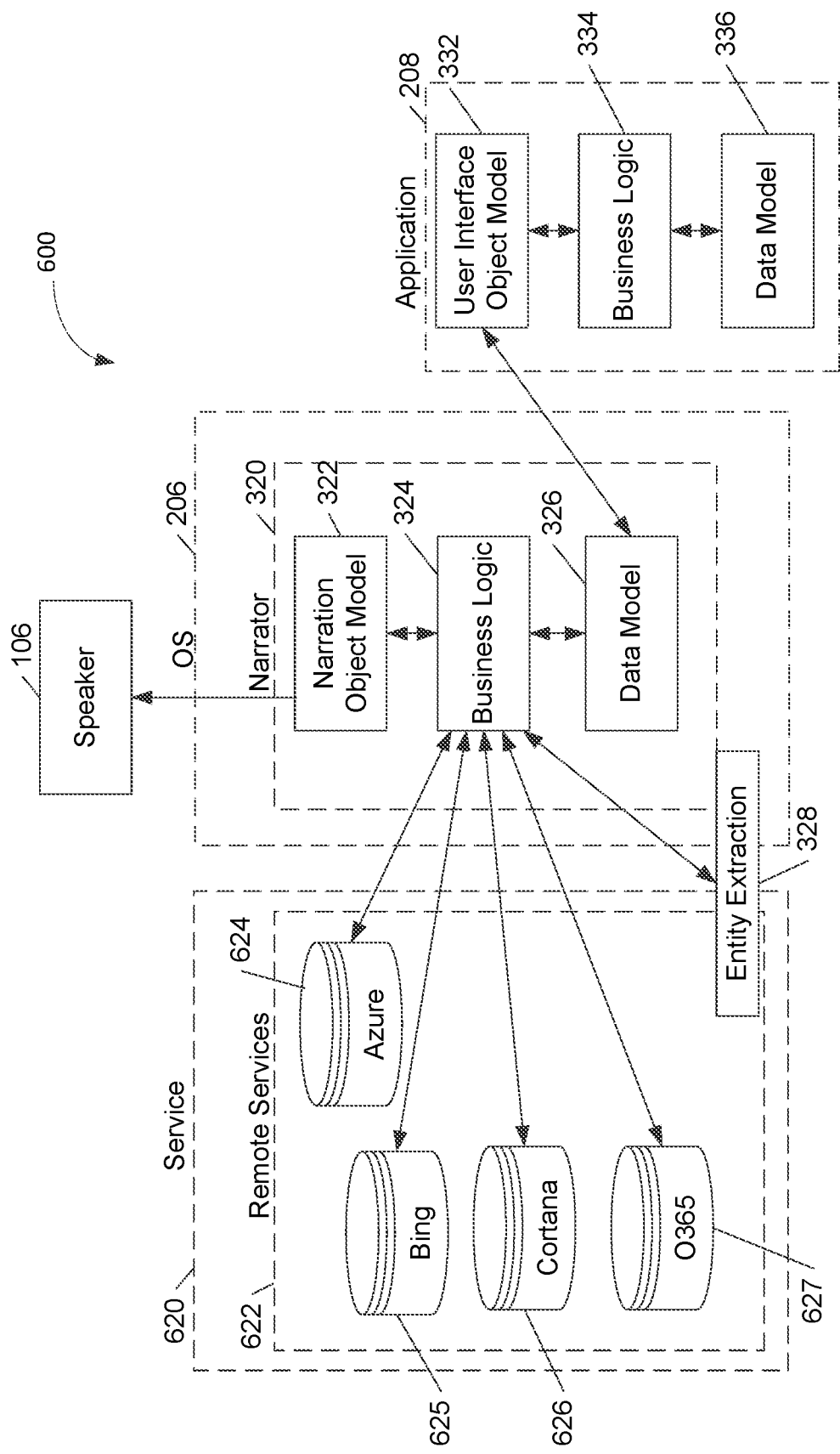
FIG. 6 illustrates yet another example of a software application interaction, in accordance with some embodiments.

FIG. 6 illustrates an interaction 600 of software applications, in accordance with some embodiments. As shown in FIG. 6, the interaction 600 includes an operating system 206, a service module 620, an application module 208 and a speaker 106. In one example, the operating system 206 includes a narrator 320, which in turn includes a narration object model 322, a business logic 324, a data model 326, and an entity extraction module 328. In one example, the service module 620 includes remote services module 622, which in turn includes a cloud service 624 (for example, Microsoft Azure), a web browser 625 (for example, Microsoft Bing), an artificial intelligence (AI) based virtual assistant 626 (for example, Microsoft Cortana), and cloud based productivity tools 627 (for example, Microsoft Office 365).

Figure 7:
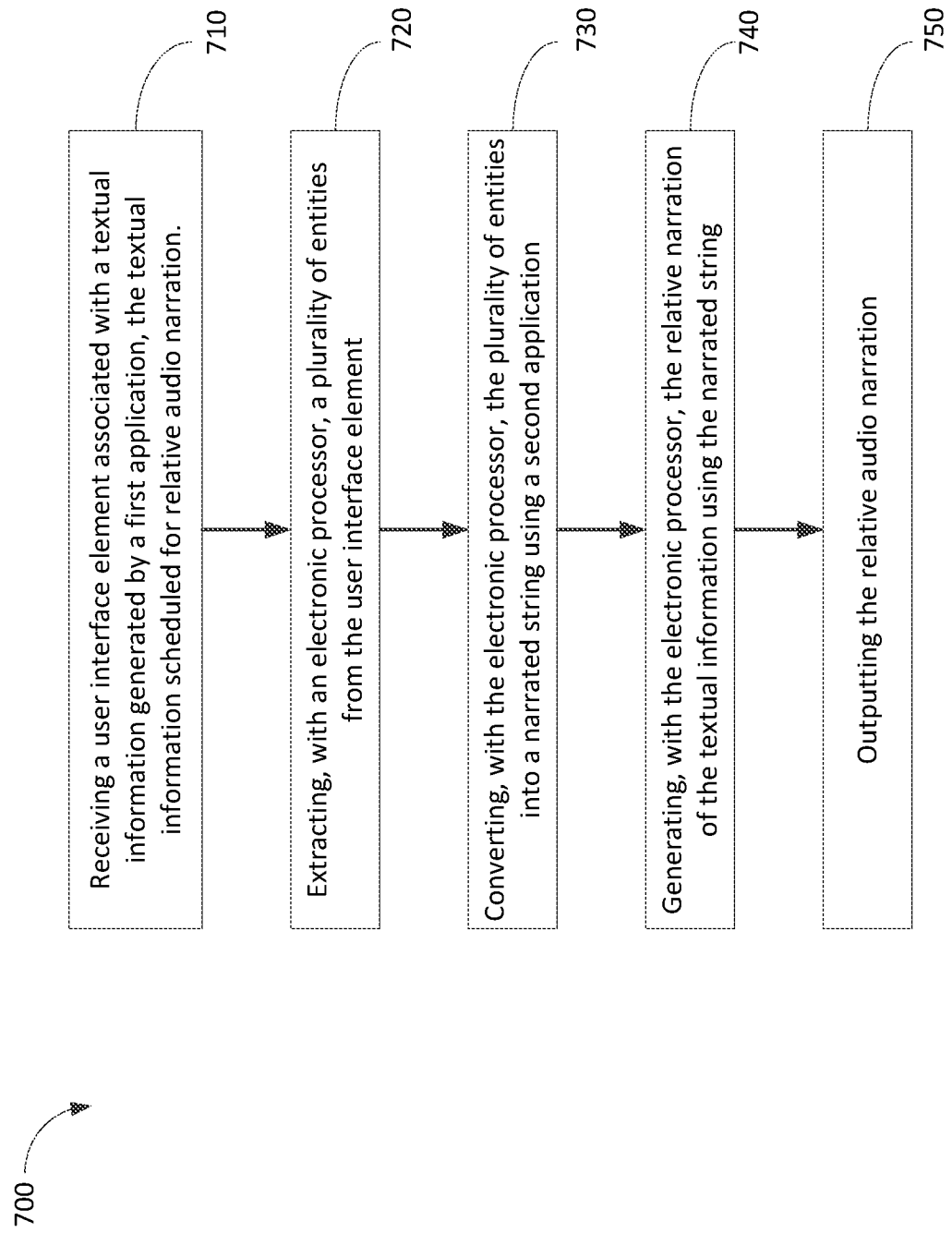
FIG. 7 is a flow chart of a method for generating relative narration in accordance with some embodiments.

FIG. 7 is a flow chart of a method 700 for generating relative narration in accordance with some embodiments. In one embodiment, the method 700 includes activating, with the electronic processor 202, a user-selectable-mode that provides relative narration for a computing device 100 (for example, by receiving a user selection to activate relative narration through the graphical user interface 112 or other input mechanism). At block 710, the method 700 includes receiving a user interface element associated with a textual information generated by a first application (some examples include an email program such as a web-based email application, a text message application, or a notification from another software application not associated with an operating system) and scheduled for relative audio narration. In one example, data models 326 (as shown in FIGS. 3, 4, 5, and 6) receive information (for example, text displayed in a user interface of a computing device 100) presented by the user interface object model 332. In one embodiment, the data model 326 is configured to correlate information received from different sources (for example, emails, browsing history, etc.).

At block 720, the method 700 includes extracting, with an electronic processor 202, a plurality of entities from the user interface element associated with textual information from the user interface object model 332. At block 720, the plurality of entities from the user interface element associated with textual information may be retrieved, processed and/or transformed using the business logic 324 and presented to the narration object model 322. In the embodiments shown in FIG. 4 and FIG. 5, the business logic 324 is configured to retrieve information from emails 342, contacts 344, documents 346 and browser history 348 to augment the textual information with contextual information before passing it to the narration object model 322. In one example, the business logic 334 uses narration object model 322 to perform natural language processing. In the embodiment shown in FIG. 5, the business logic 324 is also configured to access an entity extraction module 523, which is part of the remote services 522 (for example, a map program that resides outside the operating system 206). In one embodiment shown in FIG. 6, the business logic 324 is configured to retrieve information from several software programs residing in remote services 622 that is external to the operating system 206. In one example, the remote services 622 includes the cloud service 624 (for example, Microsoft Azure), the web browser 625 (for example, Microsoft Bing), the artificial intelligence (AI) based virtual assistant 626 (for example, Microsoft Cortana), and the cloud based productivity tools 627 (for example, Microsoft Office 365).

At block 730, the method 700 includes converting, with the electronic processor 202, the plurality of entities (for example, names, time-stamps, domain names, subjects, messages, etc. that may be related to an email message) extracted in block 720 into a narrated string using a second application that is either part of the operating system 206 or outside the operating system 206. The second application may include at least one of the following applications such as emails 342, contacts 344, documents 346, browser history 348, cloud service 624, web browser 625, artificial intelligence (AI) based virtual assistant 626, cloud based productivity tools 627) or other remote services 522. In one example, the electronic processor 202 is configured to generate an audio narration of the textual information using the narrated string. In one embodiment, the electronic processor 202 is configured to convert textual information to relative audio narration by varying the vocabulary and/or grammar of the textual information. In the embodiments shown in FIG. 4 and FIG. 5, the narration object model 322 uses the information received by the business logic 324 from emails 342, contacts 344, documents 346, and browser history 348 to convert the textual information into relative narration. In one example, the method 700 includes mapping, with the electronic processor 202, a time-stamp associated with the textual information to a relative indication of time with respect to a reference time (derived typically from an internal clock associated with the operating system 206). In the embodiment shown in FIG. 6, the narration object model 322 uses the information received by the business logic 324 from several software programs residing in remote services 622 to convert the textual information into relative narration.

At block 740, the narration object model 322 generates the relative audio narration of the textual information using the narrated string received from the business logic 324. At block 750, the method 700 includes outputting the relative audio narration.

Some examples of generating relative narration according to method 700 are provided below.

Example #1: Generating Relative Narration of an Email Message

From: Villadsen, Benjamin (12739) [mailto:bvilladsen@examplecompany.com]
Sent: Wednesday, Nov. 30, 2016 1:07 PM
To: Villadsen, Benjamin (12739); Magnus Ravn; Christian Sondergaard; Philippos Hondros; Krit Prasongsanti; Elena Barberis (IT);
Subject: Annual meeting conference call
When: Thursday, Dec. 1, 2016 3:00 PM-4:00 PM (UTC-06:00) Central Time (US & Canada).
Where: Dial In: 1-888-555-1212

In one example, the above email header is received by the data model 326 from the user interface object model 332 or application module 208. The following information from the email header is forwarded to the business logic 324.

```
{
"email addresses": {
mailto:bvilladsen@examplecompany.com,
},
"times": {
```

-continued

```
"Wednesday, November 30, 2016 1:07 PM"
"Thursday, December 1, 2016"
"3:00PM-4:00PM"
},
"people": {
"Benjamin Villadsen",
"Magnus Ravn",
"Christian Sondergaard",
"Philippos Hondros",
"Krit Prasongsanti",
"Elena Barberis",
},
"phone numbers": {
"1-888-555-1212"
}}
```

As shown in FIG. 5, the above user interface elements associated with an email message generated by an application module 208 (for example, an email program) may be provided by the data model 326 to the business logic 324 and the entity extraction module 328 to resolve the plurality of entities within the user interface elements and generate narrated strings (based on an external database, heuristics, remote services, etc.) The following information is generated and sent to the narration object model 322 after the business logic 324 has resolved the plurality of entities within the user interface elements. For example, the business logic 324 may recognize that "Krit Prasongsanti" is the same person as the email receiver and as a result, the word "You" is used to replace any reference to "Krit Prasongsanti." Similarly, when the current time in the real-time clock of the computing device 100 is 2.15 PM, Thursday, Dec. 1, 2016, the time-stamps within the email message will be re-interpreted in relation the current time of the computing device 100 such as "Yesterday," "Today," "One-Hour," etc.

```
{
"people": {
{mailto:bvilladsen@examplecompany.com, "Benjamin Villadsen"},
},
"times": {
{"Wednesday, November 30, 2016 1:07 PM", "Yesterday"},
{"Thursday, December 1, 2016, "Today"},
{"3:00PM - 4:00PM", "One Hour"},
},
"people": {
{"Benjamin Villadsen", "Benjamin from Examplecompany.com"},
{"Magnus Ravn", "Magnus"},
{"Christian Sondergaard", "Christian"},
{"Philippos Hondros", "Philippos"},
{"Krit Prasongsanti", "You"},
{"Elena Barberis (IT)", "Elena from IT"},
},
"phone numbers": {
{"1-888-555-1212", "Conference Bridge"}
}}
```

In one example, the narration object model 322 takes the above results and recomposes the narrated text appropriately and reads off the text below as provided below using speaker 106.
From: Benjamin Villadsen from "Example Company"
Sent: "Yesterday"
To: Benjamin; Magnus; Christian; Philippos; You; Elena from IT
Subject: Annual meeting conference call
When: Today, In one hour, 3:00 PM-4:00 PM Central Time
Where: Dial In: Conference Bridge Number 1-888-555-1212

Example #2: Generating Relative Narration of an
Email Message

Timestamp: Friday, Oct. 28, 2016
Sender: Frank, frank@example.com>
Receiver: you, Carol Smith <carol@example.com>, Jim <jim@example.com>, Arnold <Arnold@example.com>, Bob <bob@example.com>
Subject: Meet for lunch today?
Message body: Hey all, who is interested in going out to lunch today?

The narration strings generated from the various fields associated with the email shown above in Example A are as follows:
Time: On Friday (assuming the time stamp is within the last 7 days)
Sender: Frank
Verb: asked
Direct object: none
Subject: "Meet for lunch today"

The relative narration that may be generated for the above email is given below:
On Friday, Frank asked, "Meet for lunch today?"

Example #3: Generating Relative Narration of a
Text Message

Assuming today's date is Tuesday, Nov. 1, 2016 and the following is the email message provided at the graphical user interface 112:
Timestamp: Monday, Oct. 24, 2016 (over a week ago)
Sender: Jim <jim@example.com>
Receiver: Carol Smith <carol@example.com>, Jim <jim@example.com>
Subject: Samples for distributors
Message body: Here are the samples that the distributors requested.

The relative narration that may be generated for the above email is given below:
On October 24$^{th}$, Jim messaged Carol and Jim about "Samples for distributors."

Example #4: Generating Relative Narration of an
Email Message

Assuming today's date is Tuesday, Nov. 1, 2016 and the following is the email message rendered at the graphical user interface 112:
Timestamp: Tuesday, Nov. 1, 2016 (assume it was sent 5 minutes ago)
Sender: Kim <kim@example.com>
Receiver: you <you@example.com>, (assume it is the current user)
Subject: Let's meet to discuss sales numbers
Message body: Hey, are you free to meet tomorrow?

The relative audio narration that may be generated for the above email is given below:
A moment ago, Kim emailed you about "Let's meet to discuss sales numbers."

In some embodiments, software described herein may be executed by a server, and a user may access and interact with the software application using a portable communication device. Also, in some embodiments, functionality provided by the software application as described above may be distributed between a software application executed by a user's portable communication device and a software application executed by another electronic process or device (for example, a server) external to the portable communication device. For example, a user can execute a software application (for example, a mobile application) installed on his or her smart device, which may be configured to communicate with another software application installed on a server.

In the foregoing specification, specific embodiments have been described. However, various modifications and changes may be made without departing from the scope of the embodiments set forth in the claims below. Accordingly, the specification and figures are to be regarded in an illustrative rather than a restrictive sense, and all such modifications are intended to be included within the scope of present teachings.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. A device or structure that is "configured" in a certain way is configured in at least that way, but may also be configured in ways that are not listed.

Thus, embodiments provide, among other things, systems and methods for generating relative narration. Various features and advantages of some embodiments are set forth in the following claims.

What is claimed is:
1. A computing device comprising:
a speaker;
a display device displaying textual information received from a first application within a graphical user interface, the textual information being one of an email and a text message; and
an electronic processor electrically connected to the display device and configured to:
extract a plurality of textual entities from the textual information,
receive, from a remote service external to an operating system of the computing device, contextual information associated with a current user of the first application,
convert the plurality of textual entities into a narrated string using a second application based on the contextual information, the narrated string including a plurality of plain language expressions of the plurality of textual entities, the plurality of textual entities being converted into the narrated string by varying at least one of a vocabulary and a grammar included in content of the plurality of textual entities such that the narrated string differs from the textual information, generate relative narration of the textual information using the narrated string, and output the relative narration via the speaker, wherein varying the at least one of the vocabulary and the grammar includes replacing email addresses in the textual information with names of people associated with the email addresses and replacing location addresses in the textual information with location names associated with the location addresses.

2. The computing device of claim 1, wherein the electronic processor is further configured to receive a user selection to activate the relative narration.

3. The computing device of claim 1, wherein the textual information is selected from a group consisting of an email, a text message, and a notification from a software application.

4. The computing device of claim 1, wherein the electronic processor is further configured to generate an audio narration of the textual information using the narrated string.

5. The computing device of claim 1, wherein the relative narration is generated within an operating system.

6. The computing device of claim 5, wherein the first application is external to the operating system.

7. A method for generating relative narration, the method comprising:

receiving a user interface element associated with a textual information generated by a first application, the textual information being one of an email or a text message and being scheduled for relative narration;

extracting, with an electronic processor, a plurality of textual entities from the user interface element;

receive, from a remote service external to an operating system executing the first application, contextual information associated with a current user of the first application, converting, with the electronic processor, the plurality of textual entities into a narrated string using a second application based on the contextual information, the narrated string including a plurality of plain language expressions of the plurality of textual entities, the plurality of textual entities being converted into the narrated string by varying, with the electronic processor, at least one of a vocabulary and a grammar included in content of the plurality of textual entities such that the narrated string differs from the textual information;

generating the relative narration of the textual information using the narrated string; and outputting the relative narration via a speaker, wherein varying the at least one of the vocabulary and the grammar includes replacing email addresses in the textual information with names of people associated with the email addresses and replacing location addresses in the textual information with location names associated with the location addresses.

8. The method of claim 7, further comprising:

activating a user-selectable-mode to provide relative narration.

9. The method of claim 7, further comprising:

mapping, with the electronic processor, a time-stamp in the textual information to a relative indication of a time with respect to a reference time.

10. The method of claim 7, wherein receiving the user interface element associated with the textual information includes receiving the user interface element associated with the textual information selected from a group consisting of an email, a text message, and a notification from a software application.

11. The method of claim 7, wherein generating, with the electronic processor, the relative narration of the textual information includes generating an audio narration of the textual information using the narrated string.

12. The method of claim 11, wherein generating, with the electronic processor, the relative narration of the textual information includes accessing an entity extraction module to generate the audio narration of the textual information.

13. A non-transitory, computer-readable medium containing computer-executable instructions that when executed by one or more electronic processors cause the one or more electronic processors to:

receive a user interface element associated with a textual information generated by a first application, the textual information being one of an email or a text message and being scheduled for relative narration;

extract a plurality of textual entities from the textual information, receive, from a remote service external to an operating system of a computing device, contextual information associated with a current user of the first application, convert the plurality of textual entities into a narrated string using a second application based on the contextual information, the narrated string including a plurality of plain language expressions of the plurality of textual entities, the plurality of textual entities being converted into the narrated string by varying at least one of a vocabulary and a grammar included in content of the plurality of textual entities such that the narrated string differs from the textual information, generate the relative narration of the textual information using the narrated string, and output the relative narration via a speaker, wherein varying the at least one of the vocabulary and the grammar includes replacing email addresses in the textual information with names of people associated with the email addresses and replacing location addresses in the textual information with location names associated with the location addresses.

14. The non-transitory, computer-readable medium of claim 13, further comprising computer-executable instructions that when executed by one or more electronic processors cause the one or more electronic processors to:

activate a user-selectable-mode to provide relative narration.

15. The non-transitory, computer-readable medium of claim 13, further comprising computer-executable instructions that when executed by one or more electronic processors cause the one or more electronic processors to:

map a time-stamp associated with the textual information to a relative indication of a time with respect to a reference time.

16. The non-transitory, computer-readable medium of claim 13, wherein the textual information is selected from a group consisting of an email, a text message, and a notification from a software application.

17. The non-transitory, computer-readable medium of claim 13, wherein the computer-executable instructions when executed by one or more electronic processors cause the one or more electronic processors to generate the relative narration of the textual information using the narrated string by generating an audio narration using the narrated string.

* * * * *